United States Patent
Furuichi et al.

(10) Patent No.: US 11,531,326 B2
(45) Date of Patent: Dec. 20, 2022

(54) PLANT MANAGEMENT SYSTEM AND MANAGEMENT DEVICE

(71) Applicant: CHIYODA CORPORATION, Yokohama (JP)

(72) Inventors: Kazuya Furuichi, Yokohama (JP); Shizuka Ikawa, Yokohama (JP)

(73) Assignee: CHIYODA CORPORATION, Yokohama (JP)

( * ) Notice: Subject to any disclaimer, the term of this patent is extended or adjusted under 35 U.S.C. 154(b) by 0 days.

(21) Appl. No.: 16/825,169

(22) Filed: Mar. 20, 2020

(65) Prior Publication Data

US 2020/0218244 A1 Jul. 9, 2020

Related U.S. Application Data

(63) Continuation of application No. PCT/JP2018/041848, filed on Nov. 12, 2018.

(30) Foreign Application Priority Data

Nov. 14, 2017 (JP) .............................. JP2017-219077

(51) Int. Cl.
G05B 19/418 (2006.01)
G05B 13/02 (2006.01)

(52) U.S. Cl.
CPC ... G05B 19/41885 (2013.01); G05B 13/0265 (2013.01); *G05B 2219/31001* (2013.01); *G05B 2219/32071* (2013.01)

(58) Field of Classification Search
CPC .......... G05B 19/41885; G05B 13/0265; G05B 2219/31001; G05B 2219/32071; G05B 17/02; G05B 23/02; Y02P 90/02
See application file for complete search history.

(56) References Cited

U.S. PATENT DOCUMENTS

| | | | |
|---|---|---|---|
| 2007/0179766 A1* | 8/2007 | Cullick | E21B 43/00 703/10 |
| 2007/0234781 A1 | 10/2007 | Yamada et al. | |
| 2008/0027704 A1 | 1/2008 | Kephart et al. | |
| 2009/0132095 A1 | 5/2009 | Sekiai et al. | |
| 2012/0117011 A1 | 5/2012 | Hashimoto et al. | |

FOREIGN PATENT DOCUMENTS

| | | |
|---|---|---|
| CN | 1368460 A | 9/2002 |
| CN | 101533261 A | 9/2009 |

(Continued)

OTHER PUBLICATIONS

EPO Extended European Search Report for corresponding EP Application No. 18879622.1; dated Mar. 23, 2021.

(Continued)

*Primary Examiner* — Chad G Erdman
(74) *Attorney, Agent, or Firm* — Cantor Colburn LLP

(57) ABSTRACT

A plant management system includes: a control device; and a management device. The control device includes: a manipulation parameter setting unit that sets values of manipulation parameters; a state parameter acquisition unit that acquires values of state parameters indicating an operating condition of the plant; and a transmitter that transmits these values to the management device. The management device includes: an acquisition unit that acquires these values; a database that stores set values of manipulation parameters and actually measured values or predicted values of state parameters when the plant is operated based on the set values, corresponding to each other; and a determination unit that determines a set value of a manipulation parameter capable of improving a value of a predetermined state parameter of the plant by referring to these values and the database.

2 Claims, 4 Drawing Sheets

(56) References Cited

FOREIGN PATENT DOCUMENTS

| | | | |
|---|---|---|---|
| CN | 107045330 A | | 8/2017 |
| JP | 06202707 A | * | 7/1994 |
| JP | H06202707 A | | 7/1994 |
| JP | 07281714 A | * | 10/1995 |
| JP | H07281714 A | | 10/1995 |
| JP | H10210656 A | | 8/1998 |
| JP | 2004178492 A | | 6/2004 |
| JP | 2006344004 A | | 12/2006 |
| WO | 2007067645 A2 | | 6/2007 |
| WO | 2007067645 A3 | | 6/2007 |

OTHER PUBLICATIONS

IPIN Office Action for corresponding IN Application No. 202037010497; dated Apr. 26, 2021.

International Preliminary Examination Report on Patentability and Written Opinion of the International Searching Authority corresponding to PCT/JP2018041848; dated May 28, 2020.

International Search Report for International Application PCT/JP2018/041848; dated Jan. 8, 2019.

Canadian Office Action for corresponding CA Application No. 3,075,488; dated Jul. 8, 2021.

JPO Notification of Reasons for Refusal for corresponding JP Application No. 2017-219077; dated Jun. 22, 2021.

CNIPA First Office Action for corresponding CN Application No. 201880060830.X; dated Jan. 21, 2022.

JPO Notification of Reasons for Refusal for corresponding JP Application No. 2017-219077; dated Feb. 1, 2022.

EPO Office Action for corresponding EP Application No. 18879622.1; dated Sep. 5, 2022.

CNIPA Second Office Action for corresponding CN Application No. 201880060830.X; dated Sep. 19, 2022.

* cited by examiner

PLANT MANAGEMENT SYSTEM AND MANAGEMENT DEVICE

CROSS REFERENCE TO RELATED APPLICATIONS

This application is a continuation under 35 U.S.C. § 120 of PCT/JP2018/041848, filed Nov. 12, 2018, which is incorporated herein reference and which claimed priority to Japanese Application No. 2017-219077, filed Nov. 14, 2017. The present application likewise claims priority under 35 U.S.C. § 119 to Japanese Application No. 2017-219077, filed Nov. 14, 2017, the entire content of which is also incorporated herein by reference.

BACKGROUND OF THE INVENTION

1. Field of the Invention

The present invention relates to a plant management system for managing the operating condition of a plant and to a management device applicable to the plant management system.

2. Description of the Related Art

In plants for producing chemical products and industrial products, an experienced operator successively sets a large number of manipulation parameters to control the operation. However, it is not easy to approximate the operating condition to a desired goal by manipulating a large number of manipulation parameters and, at the same time, understanding the operating condition that could change on a minute-by-minute basis properly and predicting how various state parameters will change as manipulation parameters are changed.

A technology is known that performs reinforcement learning to simulate complicated processes in such a plant, by using various manipulation parameters and state parameters when the plant is actually operated (see, for example, JP2004-178492).

SUMMARY OF THE INVENTION

We have been aware that a technology capable of providing information useful to improve the operating condition of a plant and, at the same time, inhibiting an increase in the cost for additional hardware resources, the processing load, etc. is required to suitably support the operation of various plants.

The invention addresses the above-described issue, and a general purpose thereof is to provide a technology for suitably supporting the operation of a plant.

A plant management system according to an embodiment of the present invention includes: a control device that controls an operation of a plant; and a management device that provides information for managing an operating condition of the plant. The control device includes: a manipulation parameter setting unit that sets values of a plurality of manipulation parameters for controlling the operation of the plant; a state parameter acquisition unit that acquires values of a plurality of state parameters indicating the operating condition of the plant; and a transmitter that transmits, to the management device, the values of the manipulation parameters set by the manipulation parameter setting unit and the values of state parameters acquired by the state parameter acquisition unit. The management device includes: an acquisition unit that acquires the values of the manipulation parameters and the values of state parameters from the control device; a database that stores set values of a plurality of manipulation parameters and actually measured values or predicted values of a plurality of state parameters when the plant is operated based on the set values, corresponding to each other; and a determination unit that determines a set value of a manipulation parameter capable of improving a value of a predetermined state parameter of the plant by referring to the values of the manipulation parameters and the values of state parameters acquired by the acquisition unit and to correspondence stored in the database between the set values of the plurality of manipulation parameters and the actually measured or predicted values of the plurality of state parameters, and that presents the set value thus determined to the control device.

Another embodiment of the present relates to a management device. The management device includes: an acquisition unit that acquires, from a control device that controls an operation of a plant, values of a plurality of manipulation parameters for controlling the operation of the plant and values of state parameters indicating an operating condition of the plant; a database that stores set values of a plurality of manipulation parameters and actually measured values or predicted values of a plurality of state parameters when the plant is operated based on the set values; and a determination unit that determines a set value of a manipulation parameter capable of improving a value of a predetermined state parameter of the plant by referring to the values of the manipulation parameters and the values of the state parameters acquired by the acquisition unit and to correspondence stored in the database between the set values of the plurality of manipulation parameters and the actually measured or predicted values of the plurality of state parameters and that presents the set value thus determined to the control device.

Another embodiment of the present invention relates to a plant management system. The plant management system includes: a simulator that simulates an operating condition of a plant; a learning device that learns the simulator to learn knowledge based on set values of a plurality of manipulation parameters and actually measured values of a plurality of state parameters acquired from a control device for controlling an operation of the plant; and a database generator that calculates a predicted value of a state parameter when the plant is operated based on a set value of a manipulation parameter not acquired from the control device, by using the simulator that has been learned by the learning device and that generates a database storing the set values of the plurality of manipulation parameters and the actually measured values of the plurality of state parameters acquired from the control device and also storing set values of a plurality of manipulation parameters and predicted values of a plurality of state parameters not acquired from the control device.

Optional combinations of the aforementioned constituting elements, and implementations of the invention in the form of methods, apparatuses, systems, recording mediums, and computer programs may also be practiced as additional modes of the present invention.

DETAILED DESCRIPTION OF THE INVENTION

Figure 1:
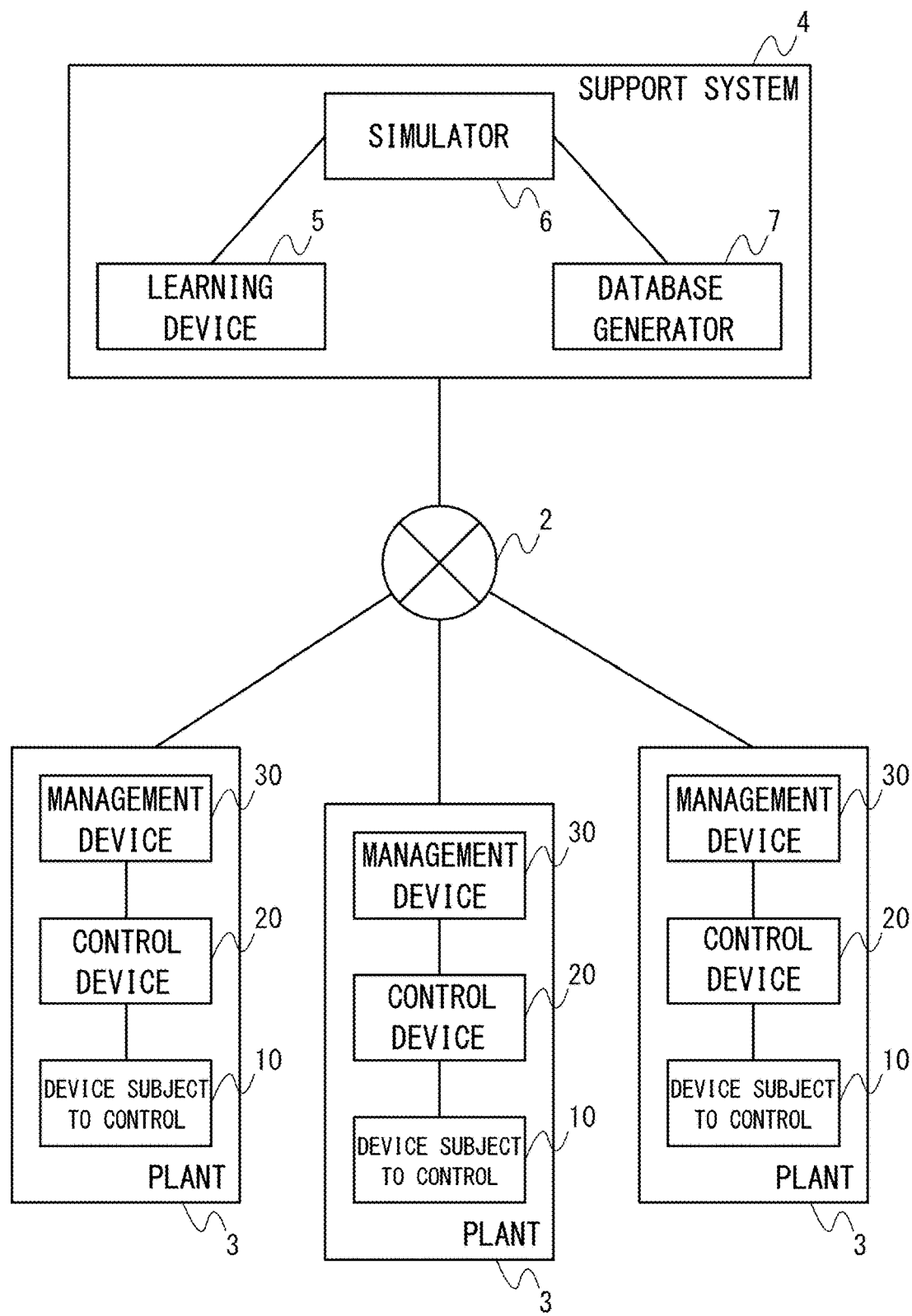
FIG. 1 shows an overall configuration of a plant management system according to an embodiment.

FIG. 1 shows an overall configuration of a plant management system according to an embodiment. The plant management system 1 includes plants 3 for producing chemical products and industrial products and a support system 4 for supporting the operation of the plurality of plants 3. Each plant 3 includes a device subject to control 10 such as a reactor and a heating furnace provided in the plant 3, a control device 20 for controlling the operation of the device subject to control 10, and a management device 30 for providing information for managing the operating condition of the plant 3. The support system 4 includes a simulator 6 for simulating the operating condition of the plant 3, a learning device 5 that learns the simulator 6 based on various information acquired from the plant 3, and a database generator 7 that uses the simulator 6, which has been learned by the learning device 5, to generate an operation database used to determine information provided by the management device 30 of the plant 3. The plants 3 and the support system 4 are connected by the Internet 2.

Figure 2:
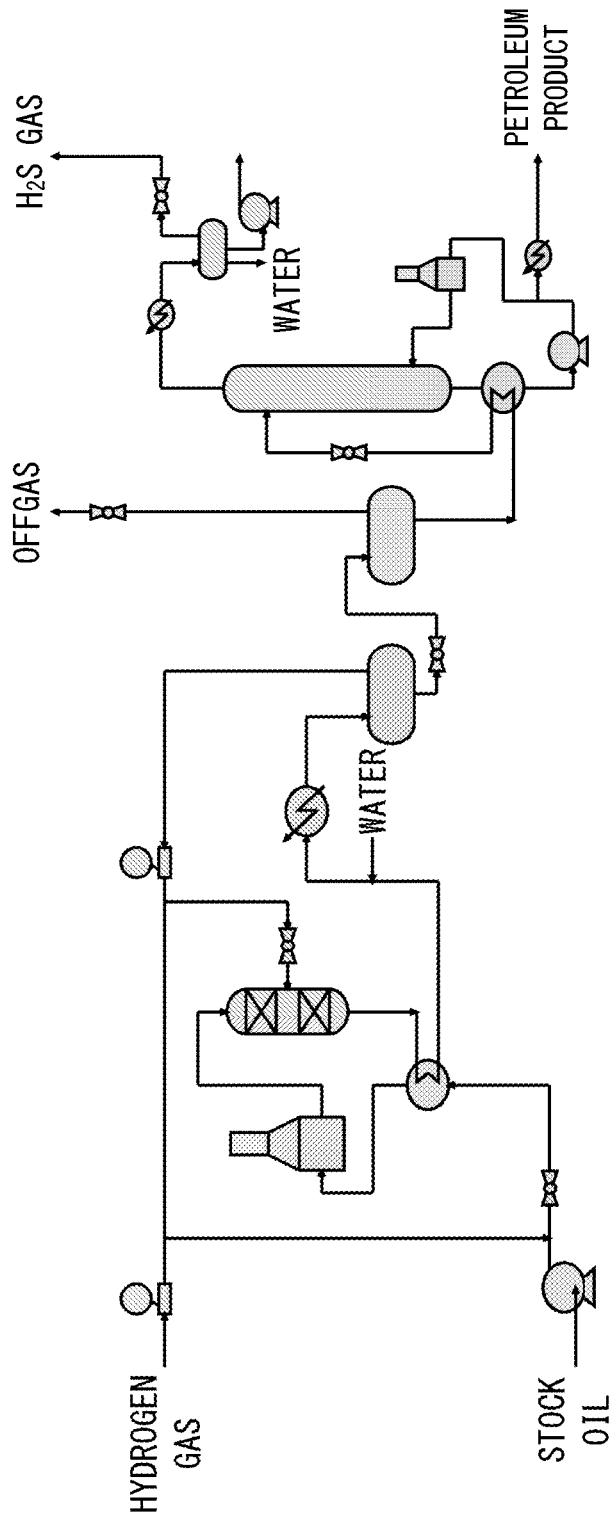
FIG. 2 shows an exemplary process flow diagram of the plant.

FIG. 2 shows an exemplary process flow diagram of the plant. The plant 3 shown in FIG. 2 includes a heating furnace, a reactor, etc. for running a desulfurization process for removing the sulfur content in crude oil or a product. The control device 20 sets the amount of fuel supplied to the heating furnace, the amount of hydrogen gas supplied to the reactor for hydrodesulfurization in accordance with a command input from the operator and controls the operation of the plant 3 accordingly. The operator sets conditions for reaction such as temperature, pressure, temperature change, and pressure change in the reactor and sets manipulation parameters such as the amount of hydrogen consumed for hydrodesulfurization, hydrogen partial pressure, hydrogen to stock ratio, etc., in accordance with values of state parameters such as the flow rate and composition of the stock oil, properties of respective oil types like proportions thereof in the blend, etc. so as to ensure that the sulfur concentration in the product is lower than a target value. In this process, it is desired to realize an operation in which the amount of fuel supplied to the heating furnace, amount of hydrogen consumed, and amount of offgas are as small as possible in order to reduce the operation cost, environmental load, etc.

Referring back to FIG. 1, the simulator 6 uses a process model that represents the operating condition of the plant 3 to calculate predicted values of various state parameters indicating the result of operation of the plant 3, by referring to values of various status parameters indicating the operating condition and set values of various manipulation parameters set by the control device 20. The process model uses various control parameters to define a relationship between i) values of status parameters and set values of manipulation parameters related to operating conditions such as the stock and facilities and ii) values of state parameters related to the result of operation.

The learning device 5 acquires, as record data when the plant 3 is actually operated, set values of a plurality of manipulation parameters and actually measured values of a plurality of state parameters from the plant 3 and learns the simulator 6 based on those values. The learning device 5 adjusts the values of various control parameters so that the values close to the actually measured values of the state parameters related to the result of operation thus acquired are calculated when the values of the state parameters and the set values of the plurality of manipulation parameters related to the operating condition thus acquired are input to the simulator 6.

Knowledge may be learned by the simulator 6 by using reinforcement learning as in the case of the technology disclosed in patent literature 1 mentioned above, or an arbitrary known technology may be used to learn the simulator 6. By learning the simulator 6 using various record data, the precision of the simulator 6 can be improved, and values of state parameters related to the result of operation of the plant 3 can be predicted more accurately.

The database generator 7 causes the simulator 6 to calculate predicted values of state parameters when the plant 3 is operated based on set values of manipulation parameters that are not acquired from the plant 3. The database generator 7 generates an operation database that stores set values of a plurality of manipulation parameters and predicted values of a plurality of state parameters that are not acquired from the plant 3, in addition to the set values of the plurality of manipulation parameters and the actually measured values of the plurality of state parameters acquired from the plant 3. The database generator 7 causes the simulator 6 to calculate predicted values for a record for which actually measured values are not available and stores the predicted values in the operation database so that records containing set values defined at predetermined intervals are included in the operation database within constraint of a range of values that the set values of the manipulation parameters can take in the plant 3. As described later, the operation database thus generated is used to provide information to support the operation in the plant 3.

Figure 3:
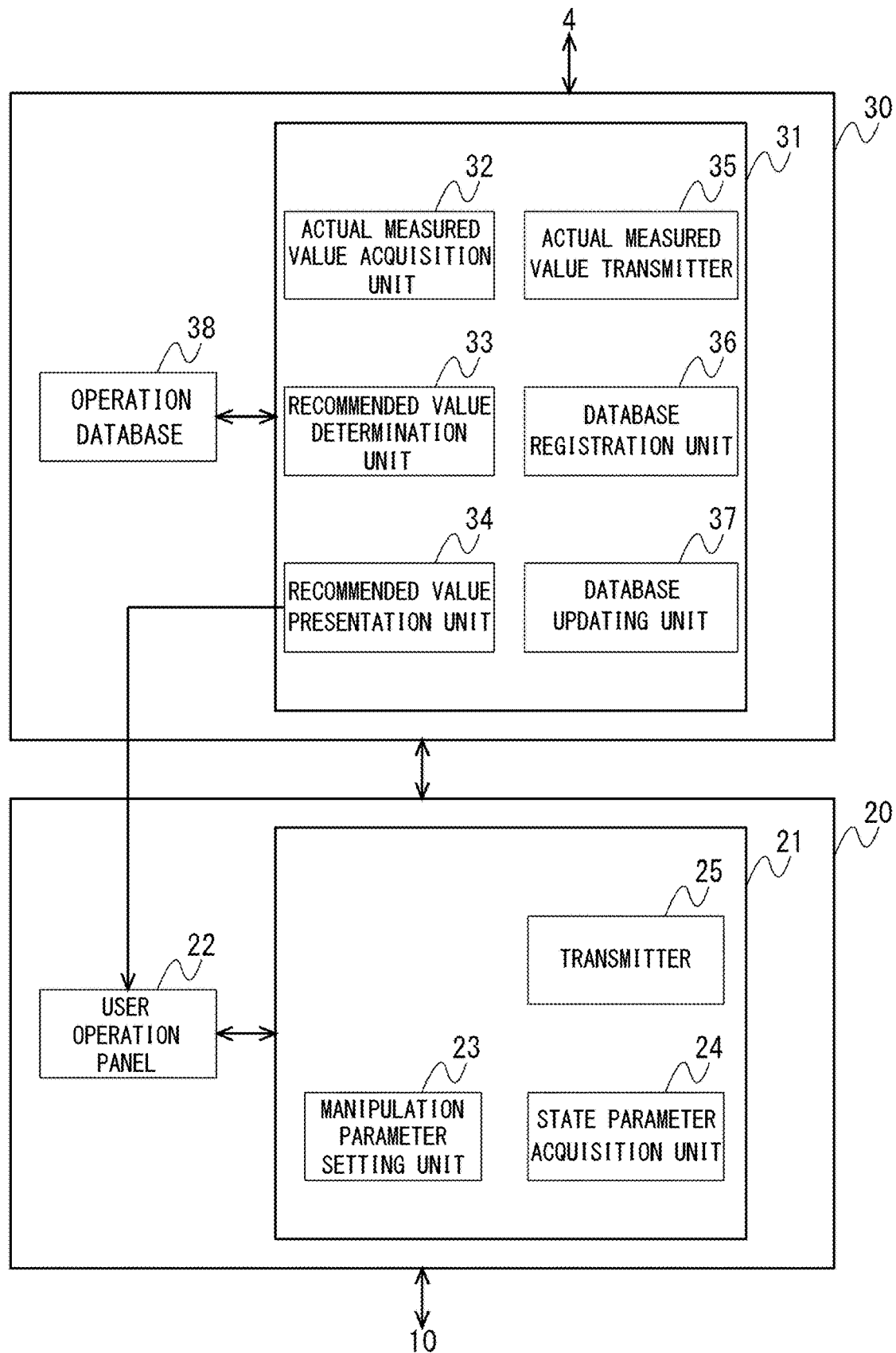
FIG. 3 shows a configuration of the control device and the management device according to the embodiment.

FIG. 3 shows a configuration of the control device and the management device according to the embodiment. The control device 20 includes a controller 21 and a user operation panel 22.

The user operation panel 22 displays values of various state parameters indicating the operating condition of the plant 3 and set values of various manipulation parameters set by the control device 20 on a display device and acknowledges inputs of set values of various manipulation parameters from the operator.

The controller 21 includes a manipulation parameter setting unit 23, a state parameter acquisition unit 24, and a transmitter 25. The features are implemented in hardware components such as a CPU and a memory in an arbitrary computer, a program loaded into the memory, etc. The figure depicts functional blocks implemented by the cooperation of these elements. Therefore, it will be understood by those skilled in the art that the functional blocks may be implemented in a variety of manners including hardware only, software only, or by a combination of hardware and software.

The manipulation parameter setting unit 23 sets the set values of the various manipulation parameters acknowledged in the user operation panel 22 from the operator to control the device subject to control 10 and displays the set values on the display device of the user operation panel 22. The state parameter acquisition unit 24 acquires values of various state parameters indicating the operating condition of the plant 3 from various sensors and measuring instruments provided in the device subject to control 10, etc. and displays the acquired values on the display device of the user operation panel 22. The transmitter 25 transmits the values of the manipulation parameters set by the manipulation parameter setting unit 23 and the values of the state parameters acquired by the state parameter acquisition unit 24 to the management device 30.

The management device 30 includes a controller 31 and an operation database 38. The operation database 38 stores set values of a plurality of manipulation parameters in the plant 3 and values of a plurality of state parameters when the plant 3 is operated based on the set values, corresponding to each other. As described above, the values of the plurality of state parameters include actually measured values when the plant 3 is actually operated and predicted values calculated by the simulator 6.

The controller 31 includes an actually measured value acquisition unit 32, a recommended value determination unit 33, a recommended value presentation unit 34, an actually measured value transmitter 35, a database registration unit 36, and a database updating unit 37. These functional blocks may also be implemented in a variety of manners by hardware only, software only, or by a combination of hardware and software.

The actually measured value acquisition unit 32 acquires the values of the manipulation parameters and the values of the state parameters from the transmitter 25 of the control device 20. The recommended value determination unit 33 refers to the values of the manipulation parameters and the values of the state parameters acquired by the actually measured value acquisition unit 32 and to the correspondence stored in the operation database 38 between the set values of the plurality of manipulation parameters and the actually measured values or predicted values of the plurality of state parameters. The recommended value determination unit 33 determines a set value of a manipulation parameter capable of improving the value of a predetermined state parameter of the plant 3 and determines the set value as recommended value. The recommended value presentation unit 34 presents the recommended value determined by the recommended value determination unit 33 on the user operation panel 22 of the control device 20.

Of the set values of the plurality of manipulation parameters, the recommended value determination unit 33 acknowledges values that are desired to be fixed and to remain unmodified from the operator. The recommended value determination unit 33 searches the operation database 38, using the acknowledged values and the values of the state parameters such as the stock and facilities as keys. The recommended value determination unit 33 retrieves a record in which the sulfur concentration of the product mapped to those values is lower than a target value and determines the set value of the manipulation parameter stored in the retrieved record as a recommended value. In the case a plurality of records are retrieved, the recommended value determination unit 33 selects one or more set values of a manipulation parameter suitable from the perspective of the operation cost, environmental load, etc. and determines the selected values as recommended values. For example, a parameter that should be prioritized may be acknowledged from the operator, and the value stored in a record containing data that maximizes or minimizes the value of the prioritized parameter may be determined as a recommended value. Alternatively, a score may be calculated by a weighting scheme based on preset set priority levels, and a recommended value may be evaluated according to the calculated score.

As described above, the operation database 38 not only stores actually measured values when the plant 3 is actually operated but also predicted values calculated by the simulator 6, which has been learned by the learning device 5 and has improved precision as a result. It is therefore possible to provide the operation database that covers the possible range of values of state parameters and set values of manipulation parameters in finer details. Therefore, despite the fact that the embodiment is simpler than running a simulation of the operating condition at every determination of recommended values and determining a recommended value accordingly, the embodiment can offer highly precise determination of a recommended value for improving the operating condition and so can suitably support the operation of the plant. Further, even in the case of the plant 3 in which record data has not been accumulated in a large volume, data of a volume necessary for highly precise determination of a recommended value are interpolated so that a recommended value can be determined highly precisely, and the operation of the plant 3 is suitably supported.

We prepared three-year record data obtained by operating the desulfurization device of the plant 3 and making a measurement at every hour and used the record data to learn the simulator 6, using the learning device 5. The database generator 7 is caused to generate the operation database 38 by using the simulator 6 that has learned knowledge in this way. The operation database 38 includes record data of 8000 records and predicted data of 205000 records calculated by the simulator 6. 100 sets, each including a value of a state parameter related to the operating condition and a set value of a manipulation parameter that should be fixed, are extracted randomly. The recommended value determination unit 33 is caused to determine one or more recommended values for each set by using the operation database 38.

There were 450 cases in which only one recommended value of the manipulation parameter was proposed. Of these, a recommended value capable of actually lowering the sulfur concentration in the product was proposed in 382 cases, demonstrating that the accuracy rate is 85%. There were 103 cases in which a plurality of recommended values of the manipulation parameter were proposed. Of these, recommended values capable of actually lowering the sulfur concentration in the product were proposed in 74 cases, demonstrating that the accuracy rate is 72%. It is therefore found that the operation database generated in the condition described above can propose recommended values highly precisely. It is believed that recommended values can be proposed even more precisely by using a larger volume of record data to learn the simulator 6.

The actually measured value transmitter 35 transmits the record data acquired by the actually measured value acquisition unit 32 to the support system 4. The learning device 5 of the support system 4 uses the record data newly transmitted from the plant 3 to learn the simulator 6 further. The actually measured value transmitter 35 may further transmit, to the support system 4, i) whether the operator has employed the recommended value presented to the operator and changed the set value of the manipulation parameter, ii) the change in the state parameter subsequent to the change to the recommended value or the absence of change, etc. In this case, the learning device 5 may further use these items of information for learning.

At a predetermined point of time, the database generator 7 calculates predicted values by using the simulator that has learned knowledge further and generates the operation database accordingly. The database updating unit 37 of the management device 30 acquires the operation database from the support system 4 at a predetermined point of time and updates the operation database 38 in the management device 30. This makes it possible to determine a recommended value even more precisely and to suitably support the control of the plant 3 by the operator, by occasionally acquiring the operation database 38 with improved precision and updating the local database accordingly. The record data for the plant 3 may be transmitted from the control device 20 to the support system 4.

The database registration unit 36 registers the record data acquired from the actually measured value acquisition unit 32 in the operation database 38. This makes it possible to improve the precision of the operation database 38 locally even before the database updating unit 37 updates the operation database 38. The database registration unit 36 may delete, from the operation database 38, a record containing a predicted value that the recommended value presentation unit 34 presented as a recommended value on the user operation panel 22 but that was not employed by the operator. This also facilitates improvement of the precision of the operation database 38 locally.

Figure 4:
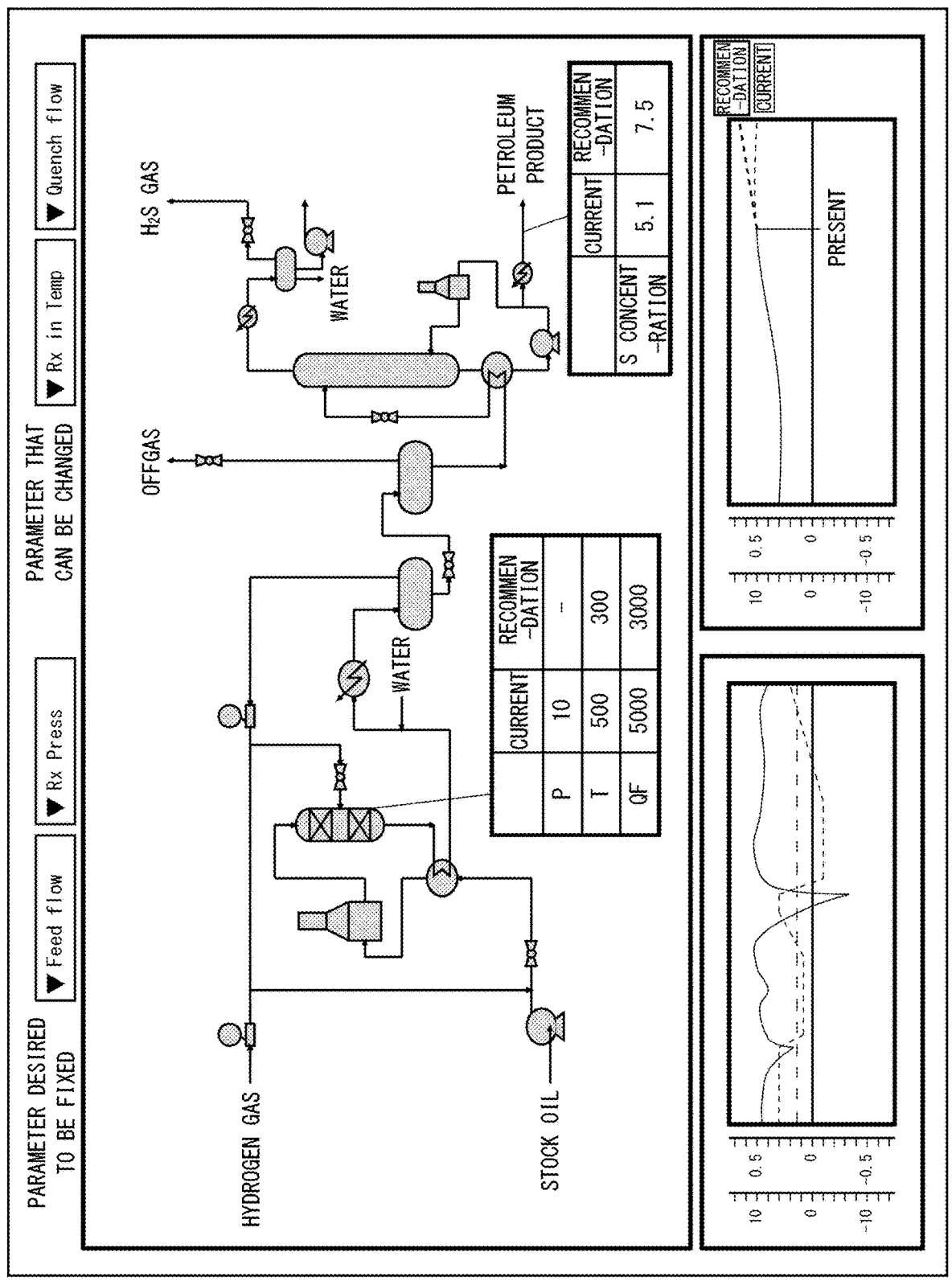
FIG. 4 shows an exemplary display screen displayed on the display device of the user operation panel.

FIG. 4 shows an exemplary display screen displayed on the display device of the user operation panel. The display screen shows the process flow diagram of the plant 3, values of state parameters related to the operating condition, values of state parameters related to the result of operation, and set values of a plurality of manipulation parameters. When the operator sets a set value of a manipulation parameter desired to be fixed and a set value of a manipulation parameter that can be changed, the recommended value determination unit 33 determines, as a recommended value, a set value of a manipulation parameter capable of realizing an operating condition that includes the fixed set value of the manipulation parameter and targeted values of state parameters and that is optimum from the perspective of the operation cost, environmental load, etc. The recommended value presentation unit 34 displays the determined recommended value on the display screen. Further, the recommended value presentation unit 34 shows, in the display screen, a graph showing time-dependent changes of state parameters indicating the result of operation of the plant 3 when a set value of a manipulation parameter is changed to the determined recommended value and the result when it is not changed. When displaying recommended value in the display screen, the recommended value presentation unit 34 may make it possible to discriminate whether the recommended value corresponds to the actually measured value or to the predicted value. The operator determines the set value of the manipulation parameter by referring to the presented recommended value and inputs the set value in the user operation panel 22. The manipulation parameter setting unit 23 controls the device subject to control 10 based on the input set value.

Described above is an explanation based on an exemplary embodiment. The embodiment is intended to be illustrative only and it will be understood by those skilled in the art that various modifications to constituting elements and processes could be developed and that such modifications are also within the scope of the present invention.

In the embodiment described above, a desulfurization process is described by way of example. However, the present invention is not only applicable to plants that execute a desulfurization process but also to plants for crude refining, chemical product manufacturing, industrial product manufacturing, etc.

What is claimed is:
1. A plant management system comprising:
    a control device that controls an operation of a plant; and
    a management device that provides information for managing an operating condition of the plant, wherein
    the control device includes:
        a manipulation parameter setting unit that sets values of a plurality of manipulation parameters for controlling the operation of the plant;
        a state parameter acquisition unit that acquires values of a plurality of state parameters indicating the operating condition of the plant; and
        a transmitter that transmits, to the management device, the values of the plurality of manipulation parameters set by the manipulation parameter setting unit and the values of the plurality of state parameters acquired by the state parameter acquisition unit, and
    the management device includes:
        an actually measured value acquisition unit that acquires the values of the plurality of manipulation parameters and the values of the plurality of state parameters from the control device;
        a database that stores set values of a plurality of manipulation parameters and actually measured values and predicted values of a plurality of state parameters when the plant is operated based on the set values, corresponding to each other; and
        a determination unit that determines a set value of a manipulation parameter capable of improving a predetermined state parameter of the plant by referring to the values of the plurality of manipulation parameters and the values of the plurality of state parameters acquired by the actually measured value acquisition unit and to correspondence stored in the database between the set values of the plurality of manipulation parameters and the actually measured and predicted values of the plurality of state parameters, and that presents the set value thus determined to the control device, and
    the plant management system further comprises:
    a simulating circuit that simulates the operating condition of the plant;
    a learning circuit that learns the simulating circuit based on the set values of the plurality of manipulation parameters and the actually measured values of the plurality of state parameters acquired from the control device; and
    a database generating circuit that calculates a predicted value of a state parameter when the plant is operated based on a set value of a manipulation a-parameter not acquired from the control device, by using the simulating circuit that has been learned by the learning circuit and that generates the database storing, in addition to the set values of the plurality of manipulation parameters and the actually measured values of the plurality of state parameters acquired from the control device, set values of a plurality of manipulation parameters and predicted values of a plurality of state parameters not acquired from the control device, and
    the determination unit acknowledges a manipulation parameter among the plurality of manipulation parameters from an operator of which a set value is desired to be fixed and to remain unmodified, searches the database using a set value of the acknowledged manipulation parameter and the values of the state parameters as keys, retrieves a record in which a value of the predetermined state parameter associated with the set value of the acknowledged manipulation parameter and the values of the state parameters is improved, and determines a set value of the manipulation parameter stored in the retrieved record as a recommended value.

2. The plant management system according to claim 1, wherein
the management device acquires the database generated by the database generating circuit at a predetermined point of time and updates the database.

\* \* \* \* \*